United States Patent Office 3,416,912
Patented Dec. 17, 1968

3,416,912
PROCESS OF KILLING PLANTS
Erik K. Regel, Mission, Kans., and Marion F. Botts, Independence, Mo., assignors to Chemagro Corporation, Kansas City, Mo., a corporation of New York
No Drawing. Filed Nov. 23, 1966, Ser. No. 596,412
12 Claims. (Cl. 71—87)

ABSTRACT OF THE DISCLOSURE

S,S - dialkyl - 2 - (alkylthio) vinyl phosphonodithioates and S,S-dialkyl-1-(alkylthio) vinyl phosphonodithioates as well as the sulfinyl analogues have been found to have selective pre-emergent herbicide activity and post-emergent herbicide activity. The S,S-diaryl and haloaryl analogues show this activity to a lesser extent. The most active compound tested was S,S-dipropyl-2-(ethylthio) vinyl phosphonodithioate. The procedure for preparing the 2-alkylthio compounds is to dehydrate an alkylthioalkanol over potassium hydroxide to form an alkylvinyl sulfide, react this with phosphorus pentachloride, treat the product with sulfur dioxide and then esterify with a mercaptan in the presence of a tertiary amine.

The 1-alkylthio compounds are prepared by chlorinating an alkyl phosphonyl dichloride to form dichloroalkyl phosphonyl dichloride isomers, esterifying the mixture with alkyl mercaptan in the presence of excess teritary amine whereby the 1,2-dichloro derivatives are simultaneously dehydrohalogenated to form the S,S-dialkyl-1-chlorovinyl phosphonodithioate which is treated with sodium mercaptide to give the desired product.

The S,S-dialkyl 1(or 2)-(alkylsulfinyl) vinyl phosphonodithioate can be prepared by oxidizing the corresponding alkylthio compounds of the invention, e.g. with hydrogen peroxide or chloroperbenzoic acid.

---

The present invention relates to vinyl phosphonodithioates

It is an object of the invention to prepare novel vinyl phosphonodithioates.

Another object is to develop novel herbicides.

An additional object is to prepare herbicides having selective pre-emergent herbicide activity.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects are obtained by preparing compounds having one of the formulae

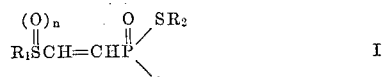

and

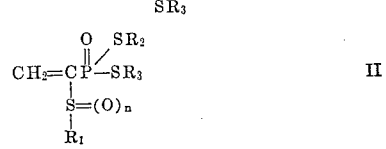

and applying them as pre and post emergent herbicides.

In the formulae $R_1$ is lower alkyl, e.g. of 1 to 4 carbon atoms, $R_2$ and $R_3$ are alkyl of 1 to 8 carbon atoms, phenyl, lower alkyl phenyl or cholorphenyl and $n$ is 0 or 1. $R_2$ and $R_3$ can be the same or different. Preferably $R_2$ and $R_3$ are lower alkyl, most preferably having 2 to 3 carbon atoms. When $R_2$ and $R_3$ are aromatic groups the herbicide activity is greatly reduced. Also when $n$ is 1 the herbicidal activity is considerably reduced compared to that observed when $n$ is 0.

It has also been observed that O,O-dialkyl (or O,O-diaryl)-2-(or 1) alkythio vinyl phosphonates for all practical purposes do not possess any herbicidal activity.

The most preferred compound is S,S-dipropyl-2-(ethylthio) vinyl phosphonodithioate.

Other compounds within the present invention include
S,S-dimethyl-2-(methylthio) vinylphosphonodithioate,
S,S-dimethyl-2-(ethylthio) vinyl phosphonodithioate,
S,S-dimethyl-2-(propylthio) vinyl phosphonodithioate,
S,S-dimethyl-2-(isopropylthio) vinyl phosphonodithioate,
S,S-dimethyl-2-(butylthio) vinyl phosphonodithioate,
S,S-dimethyl-2-(sec. butylthio) vinyl phosphonodithioate,
S-methyl-S-propyl-2-(propylthio) vinyl phosphonodithioate,
S,S-diethyl-2-(methylthio) vinyl phosphonodithioate,
S,S-dipropyl-2-(methylthio) vinyl phosphonodithioate,
S,S-diisopropyl-2-(methylthio) vinyl phosphonodithioate,
S,S-dibutyl-2-(methylthio) vinyl phosphonodithioate,
S,S-di sec. butyl-2-(methylthio) vinyl prosphonodithioate,
S,S-diamyl-2-(methylthio) vinyl phosphonodithioate,
S,S-dioctyl-2-(methylthio) vinyl phosphonodithioate,
S,S-diphenyl-2-(methylthio) vinyl phosphonodithioate,
S,S-di-p-tolyl-2-(methylthio) vinyl phosphonodithioate,
S,S-di-o-tolyl-2-(methylthio) vinyl phosphonodithioate,
S,S-di-p-butylphenyl-2-methylthio) vinyl phosphonodithioate,
S,S-di-p-chlorophenyl-2-(methylthio) vinyl phosphonodithioate,
S-ethyl - S - chlorophenyl - 2 - (methylthio) vinyl phosphonodithioate,
S,S-diethyl-2-(ethylthio) vinyl phosphonodithioate,
S,S-diisopropyl-2-(ethylthio) vinyl phosphonodithioate,
S-ethyl-S-propyl-2-(ethylthio) vinyl phosphonodithioate,
S-propyl-S-butyl-2-(ethylthio) vinyl phosphonodithioate,
S,S-dibutyl-2-(ethylthio) vinyl phosphonodithioate,
S,S-diamyl-2-(ethylthio) vinyl phosphonodithioate,
S,S-dihexyl-2-(ethylthio) vinyl phosphonodithioate,
S,S-diheptyl-2-(ethylthio) vinyl phosphonodithioate,
S,S-diphenyl-2-(ethylthio) vinyl phosphonodithioate,
S,S-di-o-chlorophenyl-2-(ethylthio) vinyl phosphonodithioate,
S,S-diethyl-2-(propylthio) vinyl phosphonodithioate,
S,S-dipropyl-2-(propylthio) vinyl phosphonodithioate,
S,S-dibutyl-2-(propylthio) vinyl phosphonodithioate,
S,S-dihexyl-2-(propylthio) vinyl phosphonodithioate,
S,S-diisooctyl-2-(propylthio) vinyl phosphonodithioate,
S,S-di-m-tolyl-2-(propylthio) vinyl phosphonodithioate,
S,S-diethyl-2-(butylthio) vinyl phosphonodithioate,
S,S-dipropyl-2-(butylthio) vinyl phosphonodithioate,
S,S-diisopropyl-2-(propylthio) vinyl phosphonodithioate,
S,S-diamyl-2-(butylthio) vinyl phosphonodithioate,
S,S-di-(2′,4′-dichlorophenyl)-2-(butylthio) vinyl phosphonodithioate,
S,S-dimethyl-2-(methyl sulfinyl) vinyl phosphonodithioate,
S,S-diethyl-2-(methyl sulfinyl) vinyl phosphonodithioate,
S,S-dipropyl-2-(methyl sulfinyl) vinyl phosphonodithioate,
S,S-dibutyl-2-(methyl sulfinyl) vinyl phosphonodithioate,
S,S-diisobutyl-2-(methyl sulfinyl) vinyl phosphonodithioate,
S,S-dioctyl-2-(methyl sulfinyl) vinyl phosphonodithioate,
S,S-diphenyl-2-(methyl sulfinyl) vinyl phosphonodithioate,
S,S-di-p-tolyl-2-(methyl sulfinyl) vinyl phosphonodithioate,
S,S-di-p-chlorophenyl-2-(methyl sulfinyl) vinyl phosphonodithioate, S,S-dimethyl-2-(ethyl sulfinyl) vinyl phosphonodithioate,
S,S,-diethyl-2-(ethyl sulfinyl) vinyl phosphonodithioate,
S-ethyl-S-propyl-2-(ethyl sulfinyl) vinyl phosphonodithioate,
S,S-dipropyl-2-(ethyl sulfinyl) vinyl phosphonodithioate,
S,S-diisopropyl-2-(ethyl sulfinyl) vinyl phosphonodithioate,
S,S-dibutyl-2-(ethyl sulfinyl) vinyl phosphonodithioate,
S,S-diamyl-2-(ethyl sulfinyl) vinyl phosphonodithioate,
S,S-dihexyl-2-(ethyl sulfinyl) vinyl phosphonodithioate,
S,S-diheptyl-2-(ethyl sulfinyl) vinyl phosphonodithioate,
S,S-diethyl-2-(propyl sulfinyl) vinyl phosphonodithioate,
S,S-dibutyl-2-(propyl sulfinyl) vinyl phosphonodithioate,
S,S-dioctyl-2-(propyl sulfinyl) vinyl phosphonodithioate,
S,S-dimethyl-1-(methylthio) vinyl phosphonodithioate,
S,S-diethyl-1-(methylthio) vinyl phosphonodithioate,
S,S-dipropyl-1-(methylthio) vinyl phosphonodithioate,
S,S-dibutyl-1-(methylthio) vinyl phosphonodithioate,
S,S-dimethyl-1-(ethylthio) vinyl phosphonodithioate,
S,S-diethyl-1-(ethylthio) vinyl phosphonodithioate,
S,S-dipropyl-1-(ethylthio) vinyl phosphonodithioate,
S-ethyl-S-sec. butyl-1-(ethylthio) vinyl phosphonodithioate,
S,S-diisopropyl-1-(ethylthio) vinyl phosphonodithioate,
S,S-dibutyl-1-(ethylthio) vinyl phosphonodithioate,
S,S-diamyl-1-(ethylthio) vinyl phosphonodithioate,
S,S-dihexyl-1-(ethylthio) vinyl phosphonodithioate,
S,S-diphenyl-1-(ethylthio) vinyl phosphonodithioate,
S,S-di-p-chlorophenyl-1-(ethylthio) vinyl phosphonodithioate,
S,S-dimethyl-1-(propylthio) vinyl phosphonodithioate,
S,S-di-propyl-1-(propylthio) vinyl phosphonodithioate,
S,S-di-heptyl-1-(propylthio) vinyl phosphonodithioate,
S,S-diethyl-1-(butylthio) vinyl phosphonodithioate,
S,S-dimethyl-1-(methyl sulfinyl) vinyl phosphonodithioate,
S,S-dimethyl-1-(ethyl sulfinyl) vinyl phosphonodithioate,
S,S-diethyl-1-(ethyl sulfinyl) vinyl phosphonodithioate,
S,S-dipropyl-1-(ethyl sulfinyl) vinyl phosphonodithioate,
S,S-dibutyl-1-(ethyl sulfinyl) vinyl phosphonodithioate,
S,S-dioctyl-1-(ethyl sulfinyl) vinyl phosphonodithioate,
S,S-diphenyl-1-(ethyl sulfinyl) vinyl phosphonodithioate,
S,S-di-p-chlorophenyl-1-(ethyl sulfinyl) vinyl phosphonodithioate,
S,S-diethyl-1-(propyl sulfinyl) vinyl phosphonodithioate,
S,S-di-p-tolyl-1-(ethyl sulfinyl) vinyl phosphonodithioate, and
S,S-dibutyl-1-(butyl sulfinyl) vinyl phosphonodithioate.

The S,S-dialkyl-2-(alkylthio) vinyl phosphonodithioates (and the corresponding aryl compounds) were prepared by the following procedure. The alkyl-hydroxy-ethyl sulfide was prepared by reacting ethylene chlorohydrin with the appropriate potassium alkyl-mercaptide in alcohol. The alkylthioethanol obtained was then dehydrated over potassium hydroxide to obtain the alkyl vinyl sulfide. Phosphorus pentachloride was added across the double bond to give a complex compound

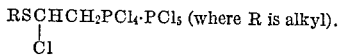 (where R is alkyl).

This was converted to the alkylthio vinyl phosphonyl dichloride with the aid of sulfur dioxide. The phosphonyl chloride was then esterified with the appropriate mercaptan (or mixture of mercaptans) in the presence of a tertiary amine such as triethyl amine.

The 1 - alkylthio compounds were prepared in the following fashion. Ethyl phosphonyl dichloride was chlorinated with chlorine, resulting in a mixture of 1,2 and 2,2-dichloroethyl phosphonyl dichloride. (Such a mixture is also disclosed in Daniewski, J. Org. Chem., vol. 31, page 2083 (1966)). The mixture was then esterified with the appropriate alkyl and/or aryl mercaptan (or mercaptans) in the presence of an excess of tertiary amine, e.g. triethyl amine. This resulted in the simultaneous dehydrohalogenation of the 1,2-dichloro derivative to give the S,S- dihydrocarbyl - 1 - chloro - vinyl phosphonodithioate which was separated by fractionation in high vacuum from the other products and then converted to the desired S,S-dihydrocarbyl - 1 - (alkylthio) vinyl phosphonodithioate by treatment with sodium alkyl mercaptide.

The 1 - alkylsulfinyl and 2 - alkylsulfinyl compounds were prepared by oxidizing the corresponding alkylthio compounds with either hydrogen peroxide dissolved in acetone or acetic acid or with m-chloroperbenzoic acid dissolved in chloroform.

Unless otherwise indicated all parts and percentages are by weight.

EXAMPLE 1

A 500-ml. 3-neck reaction flask fitted with a dropping funnel, distilling head and condenser were set up. Stirring action was providing by a hot plate equipped with a magnetic stirrer. An oil bath heated by the hot plate was used as a source of heat.

184 grams (2 moles) of methylthioethanol were added dropwise to 141 grams (2.5 moles) of molten 85% potassium hydroxide with stirring. The oil bath was maintained at 215–225° C. throughout the reaction. The product was distilled directly from the reaction mixture along with some water.

The water layer was separated from the product and the product was purified by distillation to give methyl vinyl sulfide. B.P., 71° C.; $n_D^{26}$, 1.4797; yield, 85%.

EXAMPLE 2

318 grams (3 moles) of ethylthioethanol were added dropwise to 243 grams (2.7 moles) of stirring, molten 85% potassium hydroxide. The oil bath was maintained at 215–225° C. throughout the reaction. The product was distilled directly from the reaction mixture along with some water.

The water layer was separated from the product and the product is purified by distillation to give ethyl vinyl sulfide. B.P., 91° C.; $n_D^{20}$, 1.4743; yield, 87%.

EXAMPLE 3

100 grams (0.84 mole) of n-propylthioethanol were added dropwise to 75 grams (.1 mole) of stirring, molten 85% potassium hydroxide. The oil bath was maintained at 215–225° C. throughout the reaction. The product was distilled directly from the reaction mixture along with some water.

The water layer was separated from the product and the product is purified by distillation to give n-propyl vinyl sulfide. B.P., 117° C.; $n_D^{23}$, 1.4707; yield, 50%.

EXAMPLE 4

17.3 grams (0.75 mole) of metallic sodium were reacted with a 600 ml. volume of n-amyl alcohol. 155.3 grams (0.75 mole) of 2-chloroethyl-p-chlorophenyl sulfide were then added and the resulting reaction mixture was heated to 90° C. with stirring for 2 hours.

The reaction mixture was then cooled to room temperature and the sodium chloride produced was filtered off. The clear filtrate was distilled to recover p-chlorophenyl vinyl sulfide. B.P.$_{0.05}$, 65–67° C.; $n_D^{25}$, 1.5973; yield, 53%.

EXAMPLE 5

81 grams (1.1 moles) of methyl vinyl sulfide were added dropwise over a ½ hour period to a stirring suspension of 458 grams of phosphorus pentachloride in 5–6 volumes of carbon tetrachloride. The reaction mixture was cooled to 10–20° C. throughout the addition. After the addition had been completed, the reaction mixture was allowed to warm to room temperature (25° C.). The reaction mixture was then allowed to stir for 12–14 hours.

Gaseous sulfur dioxide was then bubbled into the stirring suspension at a rapid rate. Cooling was maintained at 10–20° C. throughout the addition. The reaction was considered complete with the disappearance of the solid phase and the formation of a clear solution.

The desired 2-(methylthio) vinyl phosphonyl dichloride was obtained by direct distillation of the reaction mixture. B.P.$_{0.2}$, 99° C.; M.P., 45° C.: yield, 53%.

EXAMPLE 6

132 grams (1.5 moles) of ethyl vinyl sulfide were added dropwise over a ½ hour period to a stirring suspension of 624 grams of phosphorus pentachloride in 5–6 volumes of carbon tetrachloride. The reaction mixture was cooled to 10–20° C. throughout the addition. After the addition had been completed, the reaction mixture was allowed to warm to room temperature (25° C.). The reaction mixture was then allowed to stir for 12–14 hours.

Gaseous sulfur dioxide was then bubbled into the stirring suspension at a rapid rate. Cooling was maintained at 10–20° C. throughout the addition. The reaction was considered completed with the disappearance of the solid phase and the formation of a clear solution.

The desired 2-(ethylthio) vinyl phosphonyl dichloride was obtained by direct distillation of the reaction mixture. B.P.$_{0.05}$, 96° C.; $n_D^{20}$, 1.5669; yield, 65%.

EXAMPLE 7

41.7 grams (0.41 mole) of 1-propyl vinyl sulfide were added dropwise over a ½ hour period to a stirring suspension of 171 grams of phosphorus pentahloride in 5–6 volumes of carbon tetrachloride. The reaction mixture was cooled to 10–20° C. throughout the addition. After the addition had been completed, the reaction mixture was allowed to warm to room temperature (25° C.). The reaction mixture was then allowed to stir for 12–14 hours.

Gaseous sulfur dioxide was then bubbled into the stirring suspension at a rapid rate. Cooling was maintained at 10–20° C. throughout the addition. The reaction was considered completed with the disappearance of the solid phase and the formation of a clear solution.

The desired 2-(n-propylthio) vinyl phosphonyl dichloride was obtained by direct distillation of the reaction mixture. B.P.$_{0.15}$, 102° C.; $n_D^{20}$, 1.5578; yield, 68%.

EXAMPLE 8

51.2 grams (0.3 mole) of p-chlorophenyl vinyl sulfide were added dropwise over a ½ hour period to a stirring suspension of 125 grams of phosphorus pentachloride in 5–6 volumes of carbon tetrachloride. The reaction mixture was cooled to 10–20° C. throughout the addition. After the addition had been completed, the reaction mixture was allowed to warm to room temperature (25° C.). The reaction mixture was then allowed to stir for 12–14 hours.

Gaseous sulfur dioxide was then bubbled into the stirring suspension at a rapid rate. Cooling was maintained at 10–20° C. throughout the addition. The reaction was considered complete with the disappearance of the solid phase and the formation of a clear solution.

The desired 2-(p-chlorophenylthio) vinyl phosphonyl dichloride was obtained by direct distillation of the reaction mixture, B.P.$_{0.15}$, 155° C.; M.P., 71° C.; yield, 33%.

EXAMPLE 9

19.1 grams (0.1 mole) of 2-(methylthio) vinyl phosphonyl dichloride were diluted with 10 volumes of dry benzene. 11 grams (0.23 mole) of methyl mercaptan were then added. 20.2 grams (0.2 mole) of triethylamine were added to this stirring solution at such α dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution. The benzene layer was then further washed until all washes were neutral, dried over anhydrous sodium sulfate and the solvent was then stripped in vacuo on a steam bath. The resulting crude oil was then distilled to obtain S,S-dimethyl-2-(methylthio) vinyl phosphonodithioate (Compound 7225). B.P.$_{0.07}$, 137° C.; M.P., 34° C.; yield, 82%.

EXAMPLE 10

19.1 grams (0.1 mole) of 2-(methylthio) vinyl phosphonyl dichloride were diluted with 10 volumes of dry benzene. 14 grams (0.23 mole) of ethyl mercaptan were then added. 20.2 grams (0.2 mole) of triethylamine were added to this stirring solution at such a dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution. The benzene layer was then further washed until all washes were neutral, dried over anhydrous sodium sulfate and the solvent was then stripped in vacuo on a steam bath. The resulting crude oil was then distilled to obtain S,S-diethyl-2-(methylthio) vinyl phosphonodithioate (Compound 7161). B.P.$_{0.04}$, 135° C.; $n_D^{24}$, 1.6079; yield, 63%.

EXAMPLE 11

19.1 grams (0.1 mole) of 2-(methylthio) vinyl phosphonyl dichloride were diluted with 10 volumes of dry benzene. 15.2 grams (0.2 mole) of 1-propane thiol were then added. 20.2 grams (0.2 mole) of triethylamine were added to this stirring solution at such a dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution, and further washed until all washes were neutral. The benzene layer was then dried over anhydrous sodium sulfate and the solvent was stripped in vacuo on a steam bath. The resulting crude oil was then distilled to obtain S,S-dipropyl-2-(methylthio) vinyl phosphonodithioate (Compound 7162). B.P.$_{0.03}$, 150° C.; $n_D^{25}$, 1.5859; yield, 56%.

EXAMPLE 12

38.2 grams (0.2 mole) of 2-(methylthio) vinyl phosphonyl dichloride were diluted with 10 volumes of dry benzene. 30.5 grams (0.4 mole) of 2-propane thiol were then added. 40.4 grams (0.4 mole) of triethylamine were added to this stirring solution at such a dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution, further washed until all washes were neutral and then dried over anhydrous sodium sulfate. The solvent was then stripped in vacuo on a steam bath. The resulting crude oil was then distilled to obtain S,S-diisopropyl-2-(methylthio) vinyl phosphonodithioate (Compound 7292). B.P.$_{0.25}$, 145° C.; $n_D^{23}$, 1.5778; yield, 69%.

EXAMPLE 13

41 grams (0.2 mole) of 2-(ethylthio) vinyl phosphonyl dichloride were diluted with 10 volumes of dry benzene. 25 grams (0.4 mole) of ethyl mercaptan were then added. 40.4 grams (0.4 mole) of triethylamine were added to this stirring solution at such a dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution, further washed until all washes were neutral, dried over anhydrous sodium sulfate and the solvent was then stripped in vacuo on a steam bath. The resulting crude oil was then distilled to obtain S,S-diethyl-2-(ethylthio) vinyl phosphonodithioate (Compound 7114). B.P.$_{0.01}$, 145° C.; $n_D^{26}$, 1.5920; yield, 82%.

EXAMPLE 14

41 grams (0.2 mole) of 2-(ethylthio) vinyl phosphonyl dichloride were diluted with 10 volumes of dry benzene. 30.4 grams (0.4 mole) of 1-propanethiol were then added. 40.4 grams (0.4 mole) of triethylamine were added to this stirring solution at such a dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution, further washed until all washes were neutral, dried over anhydrous sodium sulfate and the solvent was then stripped in vacuo on a steam bath. The resulting crude oil was then distilled to obtain S,S-dipropyl-2 - (ethylthio) vinyl phosphonodithioate (Compound 7153). B.P.$_{0.02}$, 154° C.; $n_D^{27}$, 1.5767; yield, 88%.

EXAMPLE 15

20.5 grams (0.1 mole) of 2-(ethylthio) vinyl phosphonyl dichloride were diluted with 10 volumes of dry benzene. 16.7 grams (0.22 mole) of 2-propane-thiol were then added. 20.2 grams (0.2 mole) of triethylamine were added to this stirring solution at such a dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution, further washed until all washes were neutral and the benzene layer was then dried over anhydrous sodium sulfate. The solvent was then stripped in vacuo on a steam bath. The resulting crude oil was then distilled to obtain S,S-diisopropyl-2-(ethylthio) vinyl phosphonodithioate (Compound 7293). B.P.$_{0.1}$, 150° C.; $n_D^{25}$, 1.5687; yield, 60%.

EXAMPLE 16

20.5 grams (0.1 mole) of 2-(ethylthio) vinyl phosphonyl dichloride were diluted with 10 volumes of dry benzene. 18 grams (0.2 mole) of 1-butanethiol were then added. 20.2 grams (0.2 mole) of triethylamine were added to this stirring solution at such a dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution, further washed until all washes were neutral, dried over anhydrous sodium sulfate and the solvent was then stripped in vacuo on a steam bath. The resulting crude oil was then distilled to obtain S,S-dibutyl-2 - (ethylthio) vinyl phosphonodithioate (Compound 7154). B.P.$_{0.03}$, 170° C.; $n_D^{25}$, 1.5635; yield, 74%.

EXAMPLE 17

20.5 grams (0.1 mole) of 2-(ethylthio) vinyl phosphonyl dichloride were diluted with 10 volumes of dry benzene. 20.8 grams (0.2 mole) of 1-pentanethiol were then added. 20.2 grams (0.2 mole) of triethylamine were added to this stirring solution at such a dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution, further washed until all washes were neutral, dried over anhydrous sodium sulfate and the solvent was then stripped in vacuo on a steam bath. The resulting crude oil was then distilled to obtain S,S-diamyl-2-(ethylthio) vinyl phosphonodithioate (Compound 7285). B.P.$_{0.2}$, 194° C.; $n_D^{23}$, 1.5525; yield, 65%.

EXAMPLE 18

21.9 grams (0.1 mole) of 2-(n-propylthio) vinyl phosphonyl dichloride were diluted with 10 volumes of dry benzene. 13 grams (0.21 mole) of ethyl mercaptan were then added. 20.2 grams (0.2 mole) of triethylamine were added to this stirring solution at such a dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution, further washed until all washes were neutral, dried over anhydrous sodium sulfate and the solvent was then stripped in vacuo on a steam bath. The resulting crude oil was then distilled to obtain S,S-diethyl-2 - (n-propylthio) vinyl phosphonodithioate (Compound 7372). B.P.$_{0.2}$, 158° C.; $n_D^{20}$, 1.5845; yield, 55%.

EXAMPLE 19

21.9 grams (0.1 mole) of 2-(1-propylthio) vinyl phosphonyl dichloride were diluted with 10 volumes of dry benzene. 16.5 grams (0.22 mole) of 2-propane-thiol were then added. 20.2 grams (0.2 mole) of triethylamine were added to this stirring solution at such a dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution, further washed until all washes were neutral, dried over anhydrous sodium sulfate and the solvent was then stripped in vacuo on a steam bath. The resulting crude oil was then distilled to obtain S,S-di-(2-propyl)-2-(1-propylthio) vinyl phosphonodithioate (Compound 7373). B.P.$_{0.15}$, 152° C.; $n_D^{20}$, 1.5645; Yield, 51%.

EXAMPLE 20

27.5 grams (0.1 mole) of 2-(4'-chlorophenylthio) vinyl phosphonyl dichloride were diluted with 10 volumes of dry benzene. 12.5 grams (0.2 mole) of ethyl mercaptan were then added. 20.2 grams (0.2 mole) of triethylamine were added to this stirring solution at such a dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution, further washed until all washes were neutral, dried over anhydrous sodium sulfate and the solvent was then stripped in vacuo on a steam bath. The resulting crude oil was then distilled to obtain S,S-diethyl-2-(4'-chlorophenylthio) vinyl phosphonodithioate (Compound 7288). $n_D^{25}$, 1.6358; yield, 74%.

EXAMPLE 21

28 grams (0.1 mole) of 2-(4'-chlorophenylthio) vinyl phosphonyl dichloride were diluted with 10 volumes of dry benzene. 15.2 grams (0.2 mole) of 1-propanethiol were then added. 20.2 grams (0.2 mole) of triethylamine were added to this stirring solution at such a dropwise rate to keep the exothermic reaction temperature at 30–35° C. After the addition was completed, the reaction mixture was allowed to stir until room temperature was reached (25° C.).

The reaction mixture was then washed with cold water. The benzene layer was extracted with 5% sodium bicarbonate solution, further washed until all washes were neutral, dried over anhydrous sodium sulfate and the solvent was then stripped in vacuo on a steam bath. The resulting crude oil was then distilled to obtain S,S-dipropyl-2-(4'-chlorophenylthio) vinyl phosphonodithioate (Compound 7289). B.P.$_{0.04}$, 212° C.; $n_D^{20}$, 1.6158; yield, 63%.

EXAMPLE 22

6.5 grams (0.11 mole) of ethyl mercaptan were diluted with 50 ml. of anhydrous ethyl ether. 2.1 grams (0.09 mole) of metallic sodium were added and allowed to react to completion. 20 grams (0.09 mole) of S,S-diethyl-1-chlorovinyl phosphonodithioate were then added to the stirring sodium ethyl mercaptide suspension with cooling (30–35° C.). The reaction mixture was allowed to stir overnight and then it was washed with cold water until the washes were neutral. The ether layer was dried over anhydrous sodium sulfate and then stripped in vacuo. The crude oil was distilled twice to give S,S-diethyl-1-(ethylthio) vinyl phosphonodithioate (Compound 7086). B.P.$_{0.03}$ 150° C.; $n_D^{25}$, 1.5721; yield, 81%.

EXAMPLE 23

8.5 grams (0.35 mole) of S,S-diethyl-2-(methylthio) vinyl phosphonodithioate were dissolved in 2 volumes of chloroform. To this were added a solution of 6.5 grams (0.035 mole) of m-chloroperbenzoic acid dissolved in 50 ml. of chloroform at a slow dropwise rate. The addition rate was regulated to keep the reaction temperature at 30–35° C. Agitation was maintained throughout the addition. When a KI-Starch indicator paper showed the absence of m-chloroperbenzoic acid (the mixture no longer turned the paper blue), the reaction mixture was then extracted with 10% sodium carbonate solution to remove all m-chlorobenzoic acid. The chloroform layer was then dried over anhydrous sodium sulfate and stripped in vacuo on a steam bath. The oil was then filtered through activated carbon to remove any turbidity or colored impurities to obtain S,S-diethyl-2-(methyl sulfinyl) vinyl phosphonodithioate (Compound 7159). $n_D^{25}$, 1.5853; yield, 88%.

EXAMPLE 24

10 grams (0.037 mole) of S,S-dipropyl-2-(methylthio) vinyl phosphonodithioate were dissolved in 2 volumes of chloroform. To this was added a solution of 6.4 grams (0.037 mole) of m-chloroperbenzoic acid dissolved in 50 ml. of chloroform at a slow dropwise rate. The addition rate was regulated to keep the reaction temperature at 30–35° C. Agitation was maintained throughout the addition. When a KI-Starch indicator paper showed the absence of m-chloroperbenzoic acid the reaction mixture was extracted with 10% sodium carbonate solution to remove all m-chlorobenzoic acid. The chloroform layer was dried over anhydrous sodium sulfate and then stripped in vacuo on a steam bath. The oil was filtered through activated carbon to remove any turbidity or colored impurities to obtain S,S-dipropyl-2-(methylsulfinyl) vinyl phosphonodithioate (Compound 7208). $n_D^{20}$, 1.5301; yield, 99%.

EXAMPLE 25

10 grams (0.034 mole) of S,S-dibutyl-2-(methylthio) vinyl phosphonodithioate were dissolved in 2 volumes of chloroform. To this was added a solution of 6 grams (0.035 mole) of m-chloroperbenzoic acid dissolved in 50 ml. of chloroform at a slow dropwise rate. The addition rate was regulated to keep the reaction temperature at 30–35° C. Agitation was maintained throughout the addition. When a KI-Starch indicator paper showed the absence of m-chloroperbenzoic acid, the reaction mixture was extracted with 10% sodium carbonate solution to remove all m-chlorobenzoic acid. The chloroform layer was dried over anhydrous sodium sulfate and stripped in vacuo on a steam bath. The oil was filtered through activated carbon to remove any turbidity or colored impurities to obtain S,S,-dibutyl-2-(methyl sulfinyl) vinyl phosphonodithioate. $n_D^{23}$, 1.5400; yield, 99%.

EXAMPLE 26

9.5 grams (0.04 mole) of S,S-dimethyl-2-(ethylthio) vinyl phosphonodithioate were dissolved in 2 volumes of chloroform. To this was added a solution of 7.2 grams (0.042 mole) of m-chloroperbenzoic acid dissolved in 50 ml. of chloroform at a slow dropwise rate. The addition rate was regulated to keep the reaction temperature at 30–35° C. Agitation was maintained throughout the addition. When a KI-Starch indicator blue paper showed the absence of m-chloroperbenzoic acid, the reaction mixture was extracted with 10% sodium carbonate solution to remove all m-chlorobenzoic acid. The chloroform layer was dried over anhydrous sodium sulfate and then stripped in vacuo on a steam bath. The oil was filtered through activated carbon to remove any turbidity or colored impurities to obtain S,S-dimethyl-2-(ethyl sulfinyl) vinyl phosphonodithioate (Compound 7156). $n_D^{20}$, 1.5990; yield, 82%.

EXAMPLE 27

20 grams (0.07 mole) of S,S-dipropyl-2-(ethylthio) vinyl phosphonodithioate were dissolved in 2 volumes of chloroform. To this was added a solution of 12.5 grams (0.073 mole) of m-chloroperbenzoic acid dissolved in 100 ml. of chloroform at a slow dropwise rate. The addition rate was regulated to keep the reaction temperature at 30–35° C. Agitation was maintained throughout the addition. When a KI-Starch indicator paper showed the absence of m-chloroperbenzoic acid the reaction mixture was extracted with 10% sodium carbonate solution to remove all m-chlorobenzoic acid. The chloroform layer was dried over anhydrous sodium sulfate and then stripped in vacuo on a steam bath. The oil was filtered through activated carbon to remove any turbidity or colored impurities to obtain S,S-dipropyl-2-(ethylsulfinyl) vinyl phosphonodithioate (Compound 7160). $n_D^{25}$, 1.5626; yield, 67%.

EXAMPLE 28

10 grams (0.03 mole) of S,S-dibutyl-2-(ethylthio) vinyl phosphonodithioate were dissolved in 2 volumes of chloroform. To this was added a solution of 5.7 g. (0.03 mole) of m-chloroperbenzoic acid dissolved in 50 ml. of chloroform at a slow dropwise rate. The addition rate was regulated to keep the reaction temperature at 30–35° C. Agitation was maintained throughout the addition. When a KI-Starch indicator paper showed the absence of m-chloroperbenzoic acid the reaction mixture was extracted with 10% sodium carbonate solution to remove all m-chlorobenzoic acid. The chloroform layer was dried over anhydrous sodium sulfate and then stripped in vacuo on a steam bath. The oil was filtered through activated carbon to remove any turibidity or colored impurities to obtain S,S-dibutyl-2-(ethyl sulfinyl) vinyl phosphonodithioate (Compound 7207). $n_D^{24}$, 1.5502; yield, 99%.

In addition to the compound set forth in the above examples there were also tested as herbicides the following compounds within the invention—

Compound 7163: $CH_3SCH=CHP(O)(SC_4H_9)_2$ B.P.$_{0.04}$ 155° C.; $n_D^{26}$ 1.5690

Compound 7113: $C_2H_5SCH=CHP(O)(SCH_3)_2$ B.P.$_{0.05}$ 140° C.; $n_D^{28}$ 1.62000

Compound 7286: $C_2H_5SCH=CHP(O)(SC_6H_5)_2$ B.P.$_{0.05}$ 195° C.; $n_D^{25}$ 1.6531

Compound 7211: $CH_3S(O)CH=CHP(O)(SCH_3)_2$ $n_D^{23}$ 1.5964

Compound 7152: $C_2H_5S(O)CH=CHP(O)(SC_2H_5)_2$ $n_D^{20}$ 1.5810

Compound 7086:

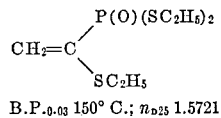

B.P.$_{0.03}$ 150° C.; $n_{D25}$ 1.5721

In the following herbicide tests there were tested O,O-dialkyl analogues of the S,S-dialkyl compounds of the present invention. The O,O-dialkyl analogues were much inferior in herbicidal activity to the corresponding S,S-dialkyl compounds. The O,O-dialkyl compounds tested were as follows—

Compound 7274: $CH_3SCH=CHP(O)(OCH_3)_2$
Compound 7276: $CH_3SCH=CHP(O)(OC_2H_5)_2$
Compound 7277: $C_2H_5SCH=CHP(O)(OCH_3)_2$
Compound 7112: $C_2H_5SCH=CHP(O)(OC_2H_5)_2$
Compound 7209: $C_2H_5S(O)CH=CHP(O)(OC_2H_5)_2$ Compound 7086:

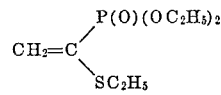

The herbicides of the present invention can be used alone or they can be applied together with inert solids to form dusts, or can be dispersed in a suitable liquid dilute, e.g. organic solvents or water.

There can also be added surface active agents or wetting agents and/or inert solids in the liquid formulations. In such case, the active ingredient can be from 0.01 to 95% by weight of the entire composition.

As organic solvents there can be employed hydrocarbons, e.g. benzene, toluene, xylene, kerosene, diesel fuel, fuel oil, and petroleum naphtha, ketones such as acetone, methyl ethyl ketone and cyclohexanone, chlorinated hydrocarbons such as carbon tetrachloride, chloroform, trichloroethylene, and perchloroethylene, esters such as ethyl acetate, amyl acetate and butyl acetate, ethers, e.g. ethylene glycol monomethyl ether and diethylene glycol monomethyl ether, alcohols, e.g. methonal, ethanol, isopropanol, amyl alcohol, ethylene glycol, propylene glycol, butyl carbitol acetate and glycerine. Mixtures of water and organic solvents, either as solutions or emulsions, can be employed. Since the phosphoryl dichlorides are hydrolyzed in water it is not one of the preferred diluents.

The novel herbicides can also be applied as aerosols, e.g. by dispersing them in air by means of a compressed gas such as dichlorodifluoromethane or trichlorofluoromethane and other Freons and Genetrons, for example.

The pesticides of the present invention can also be applied with adjuvants or carriers such as talc, pyrophyllite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

As stated, it is frequently desirable to incorporate a surface active agent in the herbicidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkyllaryl sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g. p-isooctylphenol condensed with 10 ethylene oxide units, soaps, e.g. sodium stearate and potassium oleate, sodium salt of propyl-naphthalene sulfonic acid, di(2-ethylhexyl) ester of sulfosuccinic acid, sodium lauryl sulfate, sodium decane sulfonate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene glycol esters of fatty acids and rosin acids, e.g., Ethofat 7 and 13, sodium N-methyl-N-oleyl taurate, Turkey Red Oil, sodium dibutyl naphthalene sulfonate, sodium lignin sulfonate, polyethylene glycol stearate, sodium dodecylbenzene sulfonate, tertiary dodecyl polyethylene glycol thioether (Nonionic 218), long chain ethylene oxide-propylene oxide condensation products, e.g. Pluronic 61 (molecular weight 1000), polyethylene glycol ester of tall oil acids, sodium octyl phenoxyethoxyethyl sulfate, tris (polyoxyethylene) sorbitan monostearate (Tween 60), and sodium dihexyl sulfosuccinate.

The compounds of the present invention were tested as pre-emergent herbicides at the indicated dosages against the indicated plants. In this test the surface of the soil was sprayed with an acetone solution of the test compound the same day as the seeds were planted. The flats which were planted were 14 inches long, 10 inches wide and 3.5 inches deep. 3 grams of the test material was diluted to 30 ml. with acetone. Each ml. of this solution when applied to the flat was equivalent to 1 lb./acre of test materials (active ingredient). The requisite number of ml. of the acetone solution was diluted to 40 ml. and this diluted mixture was sprayed on the flats, e.g. for 20 lbs./acre 20 ml. of the original acetone solution was diluted to 40 ml. with acetone and for 10 lbs./acre 10 ml. of the original acetone solution was diluted to 40 ml. with acetone. In the pre-emergent herbicide test the results are expressed on a 0–10 scale with 0 indicating no effect and 10 indicating complete inhibition of seeds to germinate and emerge. The results in the pre-emergent herbicide are set forth in Table 1.

TABLE 1

| Compounds: | Lbs. AI Acre | Oats | Cucumbers | Snap Beans | Corn | Millet | Flax | Cotton | Radish | Sugar Beets | Alfalfa |
|---|---|---|---|---|---|---|---|---|---|---|---|
| 7274 | 10 | 0 | | | | 0 | 0 | | 0 | 0 | |
| 7275 | 10 | 4 | | | | 0 | 1 | | 2 | 7 | |
| 7276 | 20 | 0 | | | | 0 | 0 | | 0 | 0 | |
|  | 10 | 0 | | | | 0 | 0 | | 0 | 0 | |
| 7161 | 20 | 9 | | | | 9 | 3 | | 0 | 8 | |
|  | 10 | 9 | | | | 7 | 0 | | 0 | 9 | |
|  | 8 | 9 | 1 | 2 | 1 | 9 | 4 | 1 | 0 | 7 | 7 |
|  | 4 | 5 | 0 | 3 | 2 | 0 | 2 | 1 | 0 | 6 | 6 |
|  | 1 | 0 | 0 | 0 | 0 | 0 | 0 | 2 | 0 | 3 | 2 |
| 7162 | 20 | 10 | | | | 9 | 3 | | 3 | 8 | |
|  | 10 | 10 | | | | 9 | 3 | | 1 | 5 | |
|  | 4 | 0 | 0 | 0 | 0 | 3 | 7 | 4 | 3 | 3 | 6 |
|  | 1 | 0 | 0 | 0 | 0 | 4 | 2 | 0 | 0 | 0 | 3 |
| 7292 | 15 | 10 | | | | 10 | 5 | | 3 | 10 | |
|  | 5 | 7 | | | | 10 | 5 | | 0 | 10 | |
| 7163 | 20 | 6 | | | | 9 | 4 | | 0 | 5 | |
|  | 10 | 7 | 0 | 0 | 0 | 9 | 3 | | 0 | 6 | |
|  | 4 | 0 | 0 | 0 | 0 | 3 | 7 | 4 | 3 | 3 | 6 |
|  | 1 | 0 | 0 | 0 | 0 | 4 | 2 | 0 | 0 | 0 | 3 |
| 7277 | 20 | 0 | | | | 0 | 0 | | 0 | 4 | |
|  | 10 | 0 | | | | 0 | 0 | | 0 | 0 | |
| 7113 | 15 | 3 | | | | 9 | 3 | | 0 | 0 | |
|  | 5 | 3 | | | | 8 | 0 | | 0 | 0 | |

TABLE 1—Continued

| | Lbs. AI Acre | Oats | Cucumbers | Snap Beans | Corn | Millet | Flax | Cotton | Radish | Sugar Beets | Alfalfa |
|---|---|---|---|---|---|---|---|---|---|---|---|
| 7112 | 20 | 0 | | | | 0 | 0 | | 0 | 0 | |
| | 10 | 0 | | | | 0 | 0 | | 0 | 0 | |
| | 8 | 0 | 0 | 0 | 0 | 0 | 4 | 1 | 1 | 1 | 6 |
| | 4 | 0 | 0 | 0 | 0 | 0 | 3 | 2 | 0 | 2 | 4 |
| | 1 | 0 | 0 | 0 | 0 | 0 | 0 | 1 | 0 | 0 | 2 |
| 7114 | 20 | 16 | | | | 10 | 0 | | 0 | 6 | |
| | 10 | 9 | | | | 10 | 0 | | 0 | 5 | |
| | 8 | 7 | 0 | 3 | 2 | 9 | 4 | 4 | 0 | 5 | 7 |
| | 4 | 8 | 0 | 3 | 2 | 9 | 0 | 3 | 0 | 2 | 6 |
| | 1 | 3 | 0 | 0 | 0 | 0 | 0 | 2 | 0 | 3 | 3 |
| 7153 | 20 | 10 | | | | 10 | 8 | | 8 | 9 | |
| | 10 | 9 | | | | 10 | 5 | | 0 | 8 | |
| | 4 | 8 | 0 | 1 | 0 | 10 | 6 | 0 | 0 | 7 | 6 |
| | 1 | 6 | 0 | 0 | 0 | 9 | 3 | 0 | 0 | 3 | 6 |
| 7293 | 15 | 10 | | | | 10 | 9 | | 10 | 10 | |
| | 5 | 10 | | | | 10 | 6 | | 6 | 10 | |
| 7154 | 20 | 9 | | | | 10 | 7 | | 9 | 9 | |
| | 10 | 7 | | | | 10 | 7 | | 9 | 7 | |
| | 4 | 1 | 0 | 3 | 2 | 9 | 4 | 0 | 0 | 5 | 7 |
| | 1 | 0 | 0 | 0 | 0 | 0 | 4 | 0 | 0 | 2 | 4 |
| 7285 | 15 | 5 | | | | 8 | 0 | | 0 | 3 | |
| | 5 | 0 | | | | 0 | 0 | | 0 | 0 | |
| 7286 | 15 | 0 | | | | 0 | 0 | | 0 | 0 | |
| | 5 | 0 | | | | 0 | 0 | | 0 | 0 | |
| 7372 | 15 | 10 | | | | 10 | 6 | | 7 | 9 | |
| | 5 | 10 | | | | 10 | 6 | | 7 | 9 | |
| 7373 | 15 | 9 | | | | 10 | 9 | | 7 | 9 | |
| | 5 | 9 | | | | 10 | 9 | | 5 | 9 | |
| 7288 | 15 | 3 | | | | 8 | 0 | | 0 | 0 | |
| | 5 | 3 | | | | 4 | 0 | | 0 | 0 | |
| 7289 | 15 | 4 | | | | 8 | 3 | | 0 | 5 | |
| | 5 | 0 | | | | 6 | 5 | | 0 | 0 | |
| 7211 | 20 | 0 | | | | 0 | 0 | | 0 | 0 | |
| | 10 | 0 | | | | 0 | 0 | | 0 | 0 | |
| 7159 | 20 | 8 | | | | 10 | 2 | | 0 | 2 | |
| | 10 | 7 | | | | 6 | 0 | | 0 | 3 | |
| 7208 | 20 | 9 | | | | 9 | 0 | | 1 | 6 | |
| | 10 | 9 | | | | 7 | 0 | | 0 | 8 | |
| | 4 | 4 | 0 | 0 | 3 | 9 | 3 | 1 | 0 | 3 | 3 |
| | 1 | 3 | 0 | 0 | 0 | 0 | 2 | 1 | 0 | 3 | 3 |
| 7210 | 20 | 9 | | | | 9 | 0 | | 0 | 5 | |
| | 10 | 3 | | | | 8 | 0 | | 0 | 3 | |
| | 4 | 4 | 3 | 0 | 0 | 0 | 5 | 0 | 4 | 3 | 3 |
| | 1 | 0 | 0 | 0 | 0 | 0 | 4 | 0 | 0 | 2 | 4 |
| 7156 | 20 | 0 | | | | 0 | 0 | | 0 | 0 | |
| | 10 | 0 | | | | 0 | 0 | | 0 | 1 | |
| 7209 | 20 | 4 | | | | 7 | 0 | | 0 | 1 | |
| | 10 | 5 | | | | 7 | 0 | | 0 | 1 | |
| | 4 | 3 | 0 | 0 | 0 | 7 | 0 | 0 | 1 | 3 | 5 |
| | 1 | 0 | 0 | 0 | 0 | 0 | 0 | 0 | 1 | 1 | 2 |
| 7152 | 20 | 8 | | | | 10 | 8 | | 10 | 7 | |
| | 10 | 7 | | | | 8 | 7 | | 10 | 8 | |
| 7160 | 20 | 7 | | | | 10 | 4 | | 0 | 9 | |
| | 10 | 7 | | | | 10 | 0 | | 0 | 9 | |
| | 4 | 5 | 5 | 3 | 3 | 10 | 3 | 1 | 0 | 4 | 6 |
| | 1 | 5 | 1 | 1 | 0 | 6 | 0 | 0 | 0 | 2 | 2 |
| 7207 | 20 | 5 | | | | 9 | 0 | | 0 | 3 | |
| | 10 | 0 | | | | 8 | 0 | | 0 | 3 | |
| | 4 | 3 | 0 | 4 | 0 | 6 | 5 | 4 | 3 | 3 | 5 |
| | 1 | 4 | 0 | 4 | 0 | 0 | 0 | 0 | 1 | 0 | 0 |
| 7212 | 20 | 0 | | | | 1 | 2 | | 1 | 1 | |
| | 10 | 0 | | | | 2 | 3 | | 1 | 1 | |
| 7088 | 20 | 5 | | | | 9 | 2 | | 3 | 4 | |
| | 10 | 0 | | | | 0 | 0 | | 0 | 0 | |
| 7086 | 20 | 9 | | | | 10 | 3 | | 3 | 6 | |
| | 10 | 9 | | | | 10 | 4 | | 5 | 6 | |
| 7105 | 20 | 3 | | | | 6 | 3 | | 5 | 7 | |
| | 10 | 3 | | | | 3 | 0 | | 2 | 3 | |
| 7107 | 20 | 3 | | | | 0 | 2 | | 3 | 6 | |
| | 10 | 3 | | | | 0 | 0 | | 0 | 0 | |

Compound 7153 was employed in further screening using the same procedure as set forth in connection with Table 1. Certain commercial herbicides were included in this test. The pre-emergent test results on the same 0–10 scale are given in Table 2.

Treflan is α,α,α-trifluoromethyl 2,6-dinitro-N,N-dipropyl-p-toluidine. Atrazine is 2-chloro-4-ethylamino,6-isopropylamino-s-triazine. Karmex is 3-(p-chlorophenyl)1,1-dimethylurea.

From the results in Table 2 the maximum "Safe-Use" rate of herbicide application in pounds of active ingredient

TABLE 2

| Compound | Lbs. AI/Acre | Soybeans | Cotton | Corn | Millet | Water Grass | Johnson Grass | Pigweed | Mustard | Milk Weed | Cockle Burr |
|---|---|---|---|---|---|---|---|---|---|---|---|
| 7153 | 4 | 0 | 0 | 5 | 10 | 9 | 10 | 7 | 0 | 9 | 10 |
| | 2 | 0 | 0 | 0 | 10 | 9 | 10 | 5 | 0 | 7 | 0 |
| | 1 | 0 | 0 | 0 | 9 | 9 | 10 | 5 | 0 | 7 | 0 |
| | 0.5 | 0 | 0 | 0 | 5 | 4 | 7 | 6 | 0 | 0 | 0 |
| Treflan | 4 | 6 | 0 | 8 | 10 | 10 | 10 | 10 | 6 | 9 | 0 |
| | 2 | 3 | 0 | 6 | 10 | 10 | 10 | 9 | 6 | 7 | 0 |
| | 1 | 0 | 0 | 0 | 10 | 10 | 10 | 9 | 0 | 5 | 0 |
| | 0.5 | 0 | 0 | 0 | 10 | 10 | 10 | 6 | 0 | 6 | 0 |
| Atrazine | 4 | 9 | 10 | 0 | 10 | 10 | 7 | 10 | 10 | 10 | 10 |
| | 2 | 9 | 10 | 0 | 10 | 10 | 6 | 10 | 10 | 10 | 10 |
| | 1 | 8 | 9 | 0 | 10 | 9 | 3 | 10 | 10 | 9 | 10 |
| | 0.5 | 9 | 9 | 0 | 10 | 9 | 0 | 10 | 10 | 6 | 10 |
| Karmex | 4 | 9 | 10 | 9 | 10 | 10 | 10 | 10 | 10 | 10 | 10 |
| | 2 | 9 | 9 | 7 | 10 | 10 | 10 | 10 | 10 | 10 | 10 |
| | 1 | 8 | 8 | 7 | 10 | 10 | 9 | 10 | 10 | 5 | 10 |
| | 0.5 | 6 | 4 | 5 | 10 | 10 | 8 | 10 | 10 | 4 | 5 | per acre (lbs. AI/acre) on crops is summarized in Table 3 with the values set forth being the maximum safe use rate.

TABLE 3

| Compound | Soybean | Cotton | Corn |
|---|---|---|---|
| 7153 | 4 lbs./acre | 4 lbs./acre | 2 lbs./acre. |
| Treflan | 2 lbs./acre | 4 lbs./acre | 1 lb./acre. |
| Atrazine | 2 lbs./acre | 4 lbs./acre | 4 lbs./acre. |
| Karmex | Less than 0.5 | Less than 0.5 | Less than 0.5. |

The compounds of the present invention also are useful as post-emergent herbicides. The test compounds were dissolved in acetone in the same manner as in the pre-emergent herbicide tests. The flats, however, were sprayed 10 to 14 days after planting and the herbicide activity was observed one week after the application of the test compound. The results are set forth in Table 4.

TABLE 4

| Compound | Lbs. AI/Acre | Oats | Cucumbers | Snap Beans | Corn | Millet | Flax | Cotton | Radish | Sugar Beets | Alfalfa |
|---|---|---|---|---|---|---|---|---|---|---|---|
| 7162 | 2 | 4 | | | | 6 | 7 | | 5 | 4 | |
| 7292 | 8 | 7 | | | | 8 | 9 | | 9 | 9 | |
|  | 2 | 3 | | | | 5 | 6 | | 6 | 7 | |
| 7163 | 4 | 1 | 5 | 6 | 2 | 3 | 5 | 6 | 6 | 6 | 8 |
|  | 2 | 2 | 4 | 6 | 3 | 6 | 3 | 4 | 7 | 7 | 6 |
|  | 1 | 0 | 4 | 4 | 3 | 3 | 2 | 2 | 7 | 8 | 6 |
| 7293 | 8 | 6 | | | | 9 | 9 | | 10 | 10 | |
|  | 2 | 5 | | | | 8 | 4 | | 5 | 6 | |
| 7372 | 8 | 6 | | | | 9 | 9 | | 9 | 10 | |
|  | 2 | 5 | | | | 8 | 4 | | 3 | 4 | |
| 7373 | 8 | 7 | | | | 9 | 10 | | 9 | 10 | |
|  | 2 | 5 | | | | 8 | 5 | | 6 | 6 | |
| 7288 | 8 | 5 | | | | 6 | 9 | | 7 | 10 | |
|  | 2 | 3 | | | | 4 | 5 | | 5 | 7 | |
| 7289 | 8 | 6 | | | | 6 | 8 | | 9 | 10 | |
|  | 2 | 3 | | | | 6 | 5 | | 4 | 5 | |

The following general observations can be made as the results of the tests. The S,S-dialkyl-2-(methylthio) vinyl phosphonodithioates showed distinct pre-emergent herbicidal activity on grassy weeds such as oats and millet. Branched chain ester groups appear to increase this activity, e.g. compare Compound 7292 (S,S-diisopropyl) with Compound 7162 (S,S-di-n-propyl). With increasing chain length of the ester group post-emergent herbicidal activity increases and appears to reach a peak with the S,S-dibutyl ester.

The S,S-dialkyl(-2-ethylthio) vinyl phosphonodithioates also were very active pre-emergent herbicides, particulary attacking grassy weeds. The peak of activity was found in the S,S-dipropyl esters. The S,S-diisopropyl ester had both good pre and post emergent herbicidal activity.

The S,S-diphenyl esters are relatively mild as herbicides. In general rates above 15 lbs./acre are required.

The S,S-dialkyl-2-(n-propyl-thio) vinyl phosphonodithioates have very high pre-emergent herbicidal activity on oats, millet, flax and sugar beets. The post emergent herbicidal activity is less pronounced but is still substantial, e.g. in the order of 2 lb./acre as a usable rate.

The S,S-dialkyl-2-(p-chlorophenyl-thio) vinyl phosphonodithioates had considerably reduced herbicidal activity as compared to the corresponding 2-alkyl-thio analogues in both pre- and post-emergent herbicidal tests.

The sulfinyl derivatives had lower pre- and post-emergent herbicidal activity than the unoxidized parent compounds (alkylthio compound).

The S,S-dialkyl-1-(lower alkylthio) vinyl phosphonodithioates showed high activity on oats and millets and medium activity on radish and sugar beets.

The O,O-dialkyl (or O,O-diaryl)-2-(or 1) (alkylthio) vinyl phosphonates, the oxygen analogues of the compounds of the present invention do not possess any significant herbicidal activity.

Preparation of dichloroethyl phosphonyl dichloride 360 grams (5.1 moles) of chlorine gas was bubbled into 330 grams (2.24 moles) of ethyl phosphonyl chloride at a medium to rapid rate. The reaction mixture was stirred throughout the reaction and an average temperature of 145° C. was maintained by irradiation of the reaction mixture with a 275-watt sunlamp. HCl gas evolved during the reaction.

The reaction mixture was fractionated through a 2½ ft. vacuum jacketed column packed with ceramic saddles to give the product. The product was a mixture of 1,2-dichloroethyl phosphonyl dichloride and 2,2-dichloroethyl phosphonyl dichloride. B.P.$_{15}$ 121–124° C.

Preparation of S,S-diethyl-1-chlorovinyl phosphonodithioate 60 grams (0,28 mole) of a mixture of 1,2-dichloroethyl phosphonyl dichloride and 2,2-dichloroethyl phosphonyl dichloride was dissolved in 3 volumes of dry benzene. 34.5 grams (0.56 mole) of ethyl mercaptan was then added. Triethylamine was then added to this solution at a medium dropwise rate while stirring. The temperature of the reaction mixture was maintained at 20–25° C. with an ice bath. When the pH of the mixture just turned basic, triethylamine addition was discontinued. 83.5 grams (0.83 mole) of triethylamine was consumed.

The reaction mixture was washed with cold water followed by 5% NaHCO$_3$ solution. The benzene layer was dried over anhydrous Na$_2$SO$_4$ and stripped of solvent in vacuo on a steam bath. The product was obtained by distillation. B.P.$_{0.1}$, 110–112° C., $n_D^{20}$, 1.5638, yield, 43 g. or 66%.

What is claimed is:

1. A process of killing plants comprising applying to the soil in which the plants are planted a herbicidally effective amount of a compound having a formula selected from the group consisting of (1) 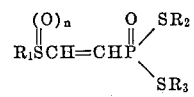

and (2) 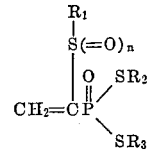

where R$_1$ is lower alkyl, R$_2$ and R$_3$ are selected from the group consisting of alkyl or 1 to 8 carbon atoms, phenyl, lower alkyl phenyl and chlorophenyl and $n$ is zero or 1.

2. A process of killing plants comprising applying to the plant habitat a herbicidally effective amount of a compound according to claim 1 having the formula

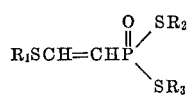

where R$_1$, R$_2$ and R$_3$ are all alkyl groups of 1 to 4 carbon atoms.

3. A process according to claim 2 wherein the compound is applied to the soil prior to the emergence of the plant.

4. A process according to claim 2 wherein the compound is applied to the plants after the emergence of the plants.

5. A process according to claim 2 wherein the compound is S,S-di-n-propyl-2-(ethylthio) vinyl phosphonodithioate.

6. A process according to claim 5 wherein the compound is applied to the soil prior to the emergence of the plants.

7. A process according to claim 5 wherein the compound is appied to a crop of soybeans, containing grassy weeds and the herbicide is used in an amount sufficient to kill the weeds but not the crop.

8. A process according to claim 7 when wherein the compound is applied to the soil prior to the emergence of the crop.

9. A process according to claim 8 wherein the compound is S,S-di-n-propyl-2-(ethylthio) vinyl phosphonodithioate, the crop is cotton containing grassy weeds and the herbicide is used in an amount sufficient to kill the weeds but not the crop.

10. A process according to claim 9 wherein the compound is applied to the soil prior to the emergence of the crop.

11. A process according to claim 8 wherein the compound is S,S-di-n-propyl-2-(ethylthio) vinyl phosphonodithioate, the crop is corn containing grassy weeds and the herbicide is used in an amount sufficient to kill the weeds but not the crop.

12. A process according to claim 11 wherein the compound is applied to the soil prior to the emergence of the crop.

References Cited

UNITED STATES PATENTS

| | | | |
|---|---|---|---|
| 2,708,204 | 5/1955 | Bell et al. | 260—960 |
| 2,836,534 | 5/1958 | Birum | 71—87 |
| 2,857,305 | 10/1958 | Birum | 260—947 |
| 3,029,270 | 4/1962 | Schrader | 260—956 X |
| 3,047,605 | 7/1962 | Schrader | 260—956 X |
| 3,094,405 | 6/1963 | Fontoy | 71—87 |
| 3,193,372 | 7/1965 | Regel | 71—87 X |

OTHER REFERENCES

Anisirnov et al.; Chemical Abstracts, vol. 50, p. 13784 (1956).

Daniewski et al.; J. Org. Chem., vol. 31, p. 2083 (1966).

JAMES O. THOMAS, JR., *Primary Examiner.*

U.S. Cl. X.R.

260—948; 71—93, 120, 121